(12) United States Patent
Hopwood et al.

(10) Patent No.: US 7,533,767 B2
(45) Date of Patent: May 19, 2009

(54) APPARATUS FOR FORMING GROUPS OF BATTERY PLATES

(75) Inventors: Robert T. Hopwood, Somerset (GB); Christopher S. Barge, Bristol (GB)

(73) Assignee: TBS Engineering Limited, Cheltenham (GB)

( * ) Notice: Subject to any disclaimer, the term of this patent is extended or adjusted under 35 U.S.C. 154(b) by 218 days.

(21) Appl. No.: 11/383,011

(22) Filed: May 12, 2006

(65) Prior Publication Data

US 2006/0255533 A1 Nov. 16, 2006

(30) Foreign Application Priority Data

May 12, 2005 (GB) ................... 0509646.6

(51) Int. Cl.
*B65G 47/26* (2006.01)
(52) U.S. Cl. .................. 198/419.3; 198/431; 198/867.1
(58) Field of Classification Search ............. 198/419.2, 198/419.3, 431, 867.1, 803.13
See application file for complete search history.

(56) References Cited

U.S. PATENT DOCUMENTS 3,292,505 A * 12/1966 Wiseman ................. 198/419.3
3,683,758 A * 8/1972 Feldkamper .............. 414/788.4
3,880,059 A * 4/1975 Brockmuller ............... 414/789
5,097,939 A * 3/1992 Shanklin et al. .......... 198/419.2
5,129,643 A 7/1992 Johnson et al.
5,862,651 A * 1/1999 Stewart et al. ........... 198/419.3
5,979,634 A * 11/1999 Odegard et al. .......... 198/419.3
6,360,872 B1 3/2002 Guidetti
7,055,816 B2 * 6/2006 Leu ........................... 414/789

FOREIGN PATENT DOCUMENTS

FR 2 489 279 8/1980

OTHER PUBLICATIONS

Search Report for Application No. GB0509646.6 dated Aug. 3, 2005.

* cited by examiner

*Primary Examiner*—James R Bidwell
(74) *Attorney, Agent, or Firm*—Marshall, Gerstein & Borun LLP

(57) ABSTRACT

Apparatus for forming groups of stacked battery plates is generally indicated at 10 and includes input stations 11, 11', respective envelopers 12, further input conveyors 13, 13' for inputting plates onto respective conveyor 15, 15' downstream of the envelopers. Transfer conveyors 22, 22' are disposed at respective ends of the main conveyor 15, 15' to feed an intermittently driven pocket conveyor 16, 16 via interrupt conveyors 23, 23'. The interrupt conveyors 23 include respective releaseable stops 32, which enable stacks to be formed on the interrupt conveyors 23, 23' and for them to be released at the appropriate moment to be fed into a respective pocket on the pocket conveyor 16, 16'.

12 Claims, 7 Drawing Sheets

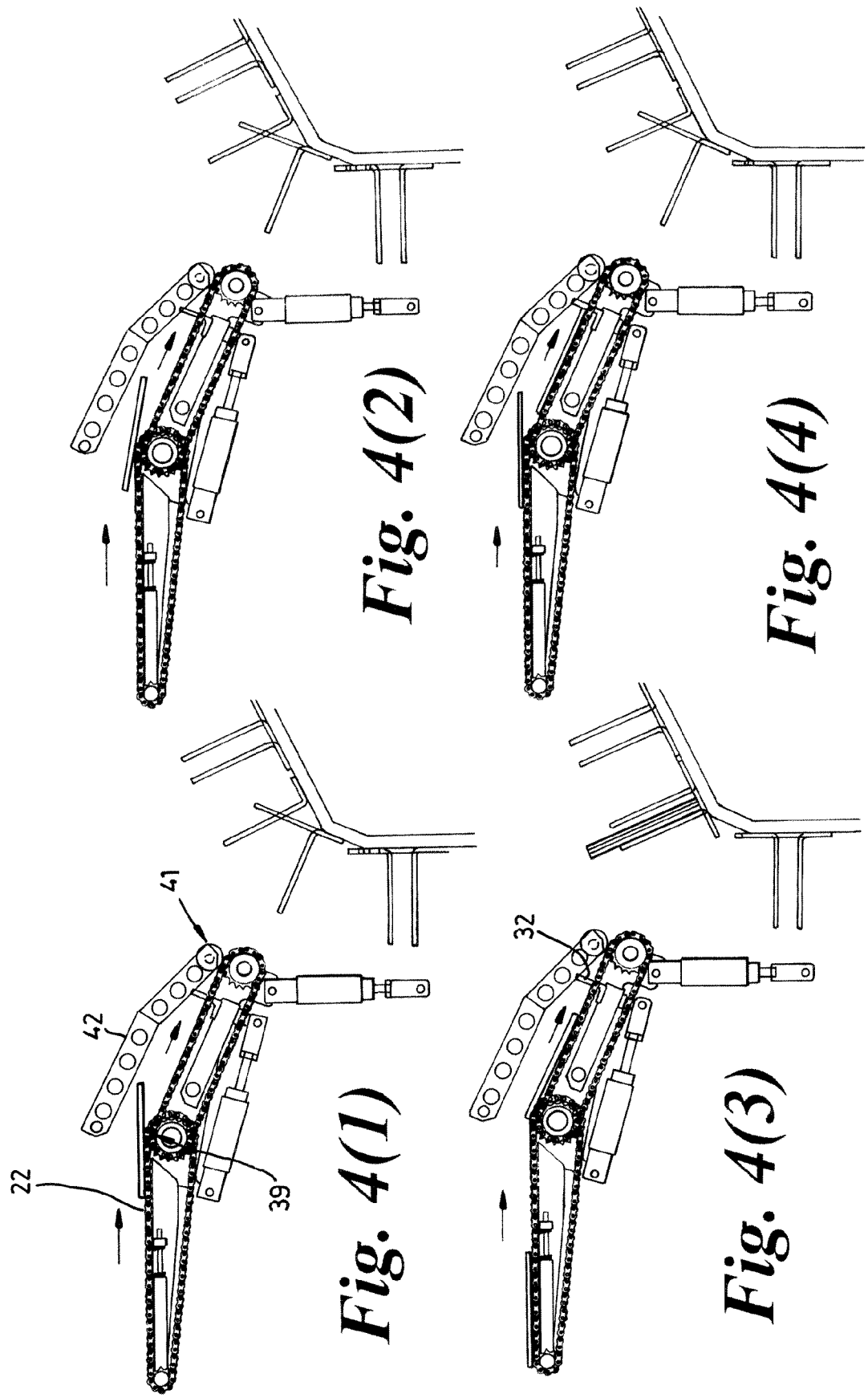

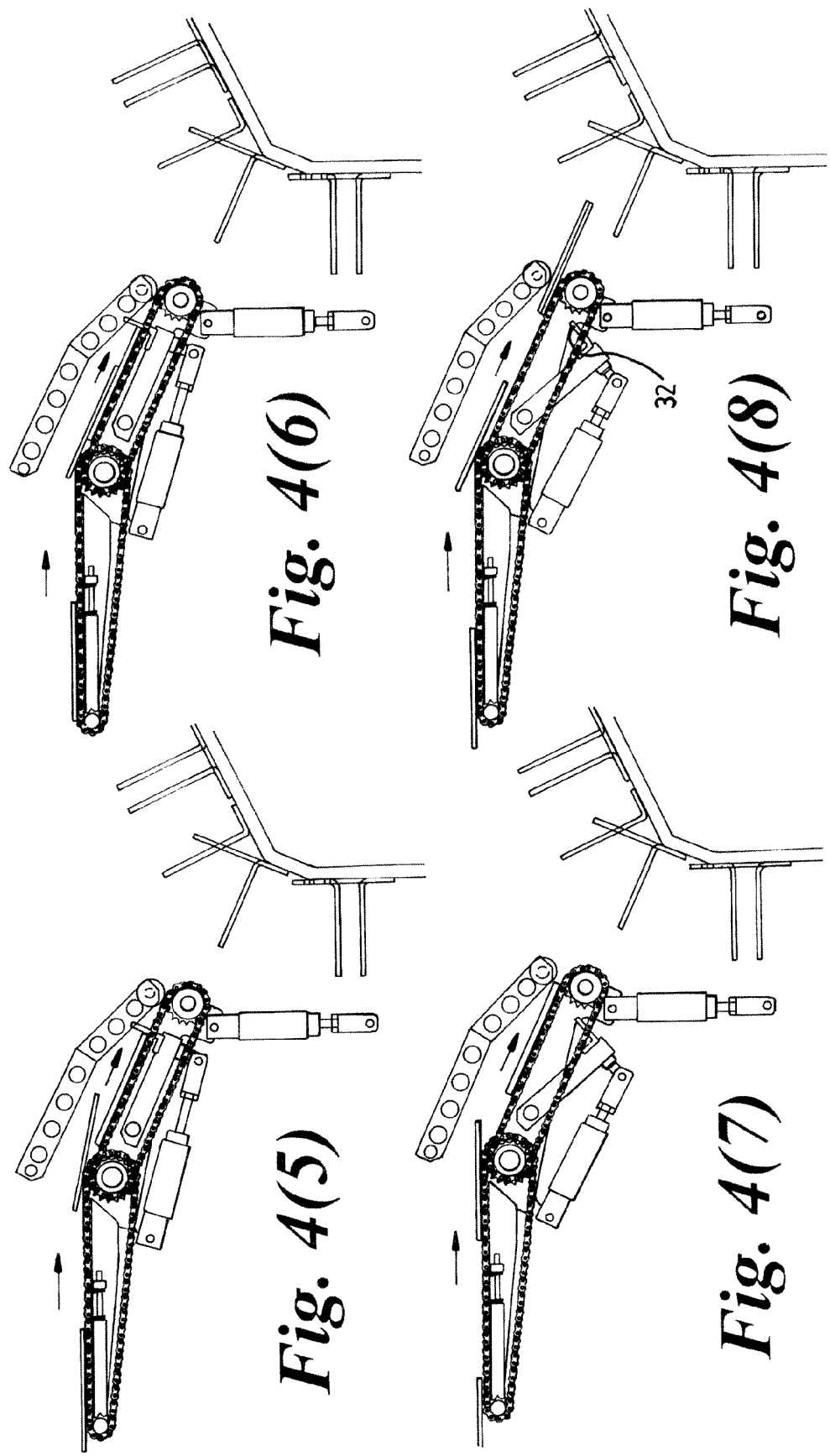

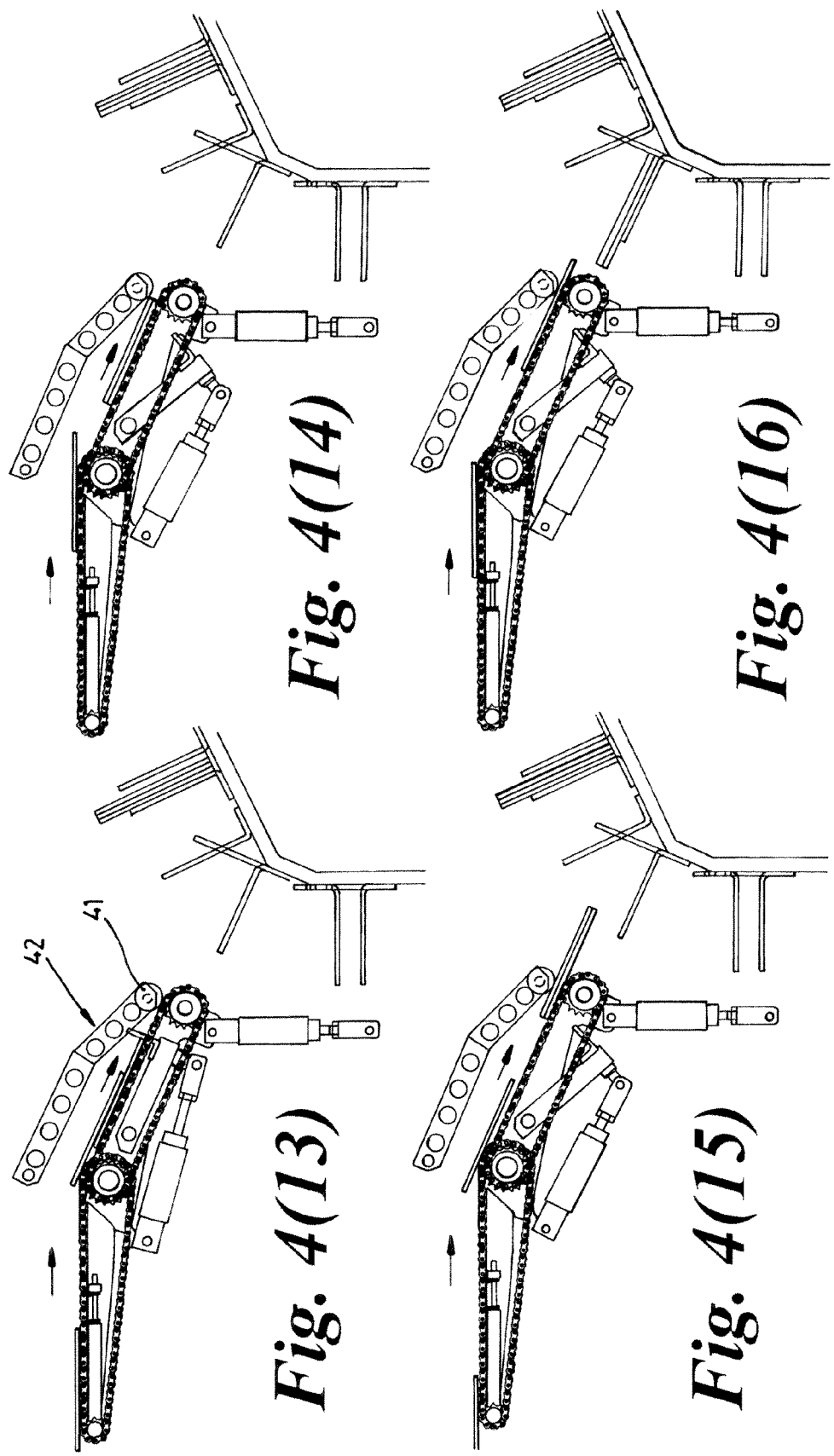

APPARATUS FOR FORMING GROUPS OF BATTERY PLATES

CROSS REFERENCE TO RELATED APPLICATIONS

A claim to priority is made to UK Patent Application No. 0509646.6 filed 12 May 2005.

BACKGROUND OF THE INVENTION

1. Field of Invention

This invention relates to apparatus for forming groups of battery plates.

2. Description of the Related Art

A number of forms of batteries use metal plates arranged in linked groups disposed in compartments in the battery box. Often some of the plates are enveloped in insulating porous material to allow positive and negative plates to be held apart, whilst allowing the passage of electrolyte. It is accordingly necessary to assemble groups of plates so that they can have straps cast onto their terminals before insertion into their respective compartment. Traditionally this assembly of groups was extremely labour intensive and rather slow. In more recent years steps have been taken to automate the procedure and to increase the speed at which groups are formed. In addition the plates have become more and more delicate.

The current arrangements have the plates, often in mini stacks of an enveloped and an unenveloped plate, being delivered at spaced intervals to the end of a conveyor where they are shot off, across a gap into a pocket formed on a downstream conveyor. All the plates which enter a single pocket form a group. This leads to significant timing difficulties and the delicate plates can readily become damaged.

To assist in the timing it is known to have an interrupt device at the end of the upstream conveyor, which can temporarily contain a first mini stack for sufficiently long for the next mini stack to be delivered on top of the first restrained mini stack. However, in order to achieve this a ramp has to be introduced through the bed of the conveyor to enable the following mini stack to take off and land on the retained first mini stack. This introduces considerable difficulties in maintaining alignment and is very difficult to control with any accuracy at high speed.

SUMMARY OF THE INVENTION

From one aspect the invention consists in apparatus for forming groups of battery plates including:
(a) a first conveyor having a conveying surface for conveying space plates or stacks of plates towards one end thereof, and
(b) a second conveyor spaced from the one end and defining pockets for receiving the plates or stacks of plates to define groups of plates wherein the apparatus further includes a third conveyor substantially bridging a gap between the one end of the first conveyor and a second conveyor and an interrupt device for temporarily retaining the plates or stacks of plates on the third conveyor at an interrupt location so as to await the presentation of an empty pocket adjacent the gap.

The inclusion of a third conveyor can bring a number of benefits. At first it can be driven at a different speed to the first conveyor enabling better synchronisation with the second conveyor. Secondly it allows for the possibility of the interrupt location lying beneath the level of the conveying surface of the first conveyor and hence provides the possibility of a following plate or stack of plates being fed on to a first plate or set of plates retained at the interrupt location without the need to cause the following plate or stack of plates to "fly". Thirdly by bridging the gap, and utilising a slower speed, the third conveyor can convey the plates into the pocket conveyor more gently giving rise to less likelihood of damage.

In a preferred embodiment a first motive source is provided for driving the first conveyor at a first speed and a second motive source is provided for driving the second conveyor at a second slower speed. These could be independent motors (e.g. servomotors) but particularly conveniently each motive source may include a sprocket and the sprockets may be mounted on a common shaft, the first motive source sprocket having a larger diameter than the second motive source sprocket to provide the difference in conveyor speeds.

The third conveyor may extend at an angle to the first conveyor so that the plate or stack of plates transfers by over balancing at the one end and conveniently the angle of the third conveyor may be generally equal to the orientation of a pocket when it is adjacent the gap.

The interrupt device may include one or more stops for insertion and withdrawal from a path of travel of the plates or stack of plates along the third conveyor. For example, the stops may be inserted and withdrawn through the third conveyor.

A control may be provided for controlling the operation of the interrupt device and or the speed of the conveyor the control may include a memory for retaining the control settings for any particular plate size to allow automatic resetting of the apparatus when a particular plate size is to be processed.

Although the invention has been defined above it is to be understood it includes any inventive combination of the features set out above or in the following description, for example the apparatus may further include a hold down device acting on the third conveyor.

BRIEF DESCRIPTION OF THE DRAWINGS

The invention may be performed in various ways and specific embodiments will now be described with reference to the accompanying drawings, in which.

Figure 1:
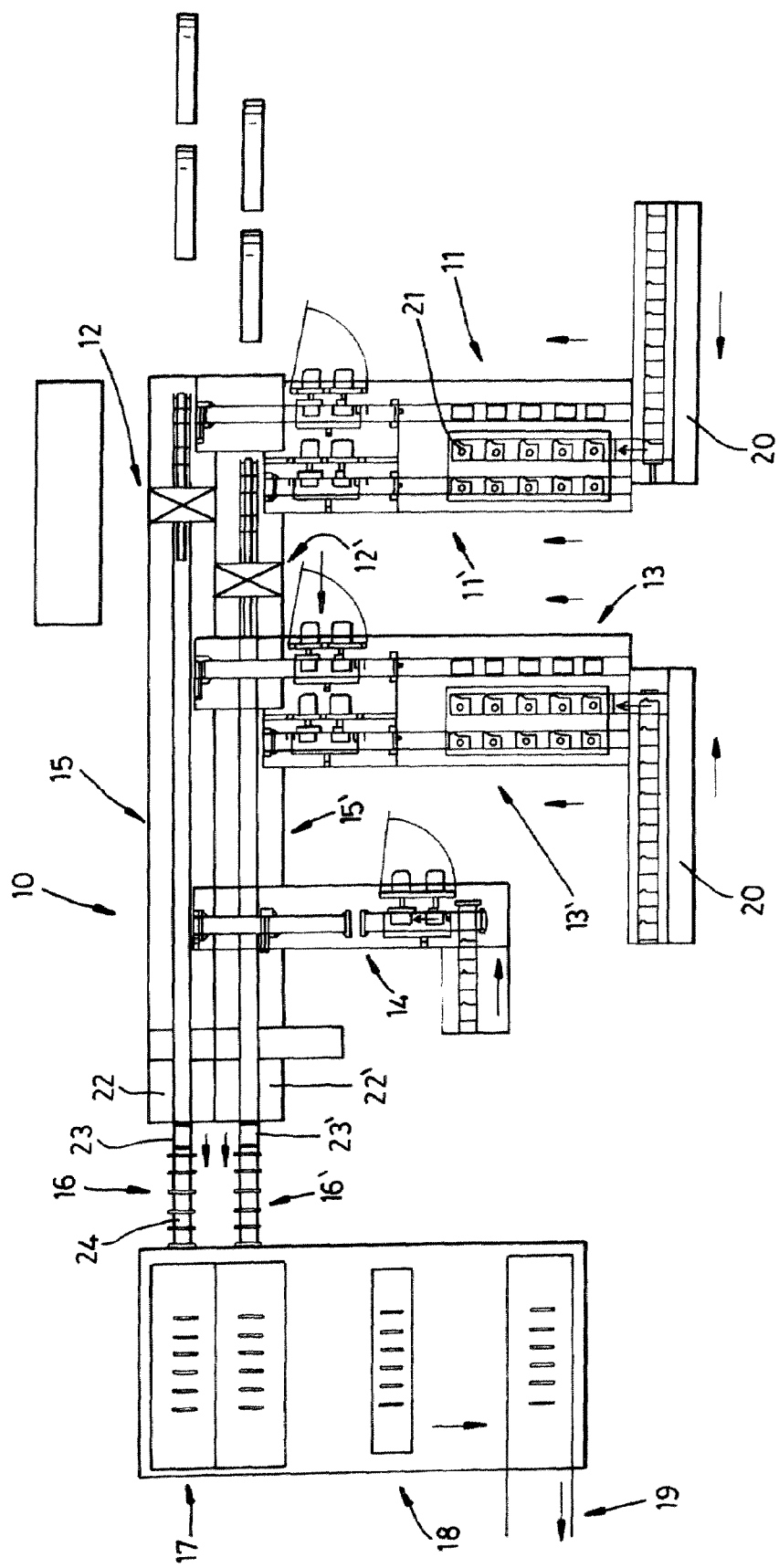
FIG. 1 is a plan view of apparatus for forming groups of battery plates.
Figure 2:
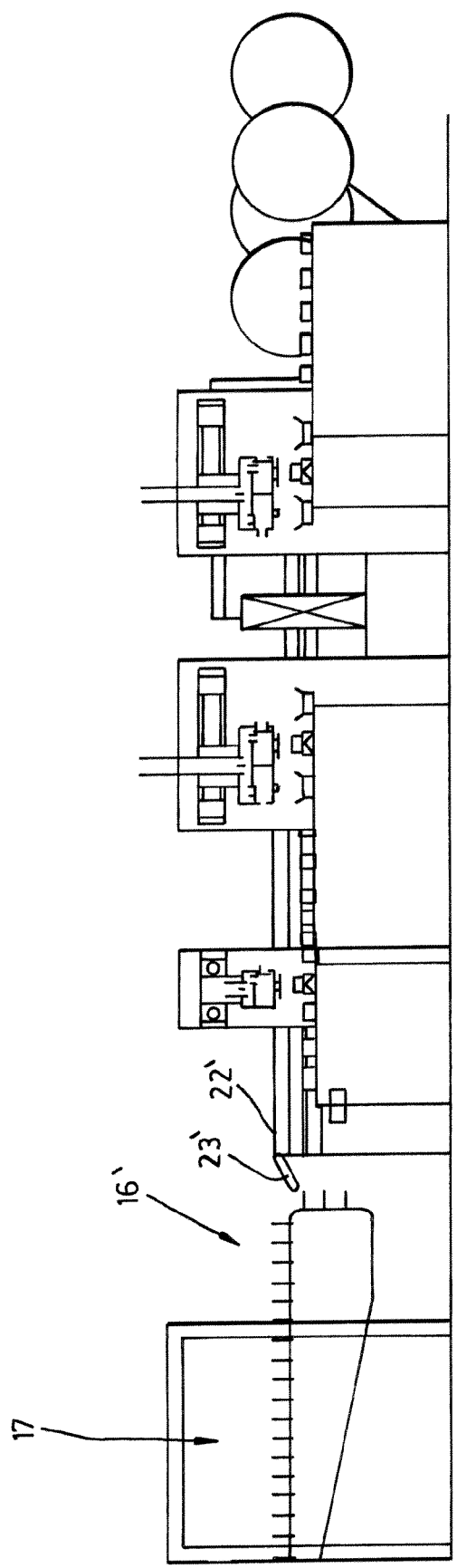
FIG. 2 is a side view of the apparatus for FIG. 1

Apparatus for forming groups of stacked battery plates is generally indicated at 10 and includes input stations 11, 11', respective envelopers 12 for enveloping battery plates 21, further input conveyors 13, 13' for inputting plates onto respective conveyors 15, 15' downstream of the envelopers 12, 12' and an additional plate input 14 for adding further plates to the main conveyors 15, 15'. Transfer conveyors 22, 22' are disposed at the respective ends of main conveyors 15, 15' to feed an intermittently driven pocket conveyor 16, 16' via interrupt conveyors 23, 23'. Groups of battery plates formed in the pocket conveyors, 16, 16' are fed to a buffer 17, from whence they are removed by handling apparatus 18 to be fed onto a conveyor 19 that takes the formed groups to cast off strap apparatus not shown.

As has been described in our European Patent Application 05250059.2, the contents of which are incorporated herein by reference, plates 21 which have been enveloped and those which have not are passed onto the main conveyors 15, 15' and can conveniently be formed in mini stacks such as, for example, a combination of a negative plate and an enveloped positive plate. These move onto the transfer conveyors 22, 22' and thence onto an interrupt conveyors 23, 23' before being delivered into the pockets 24 formed on the pocket conveyors 16, 16'.

Figure 3:
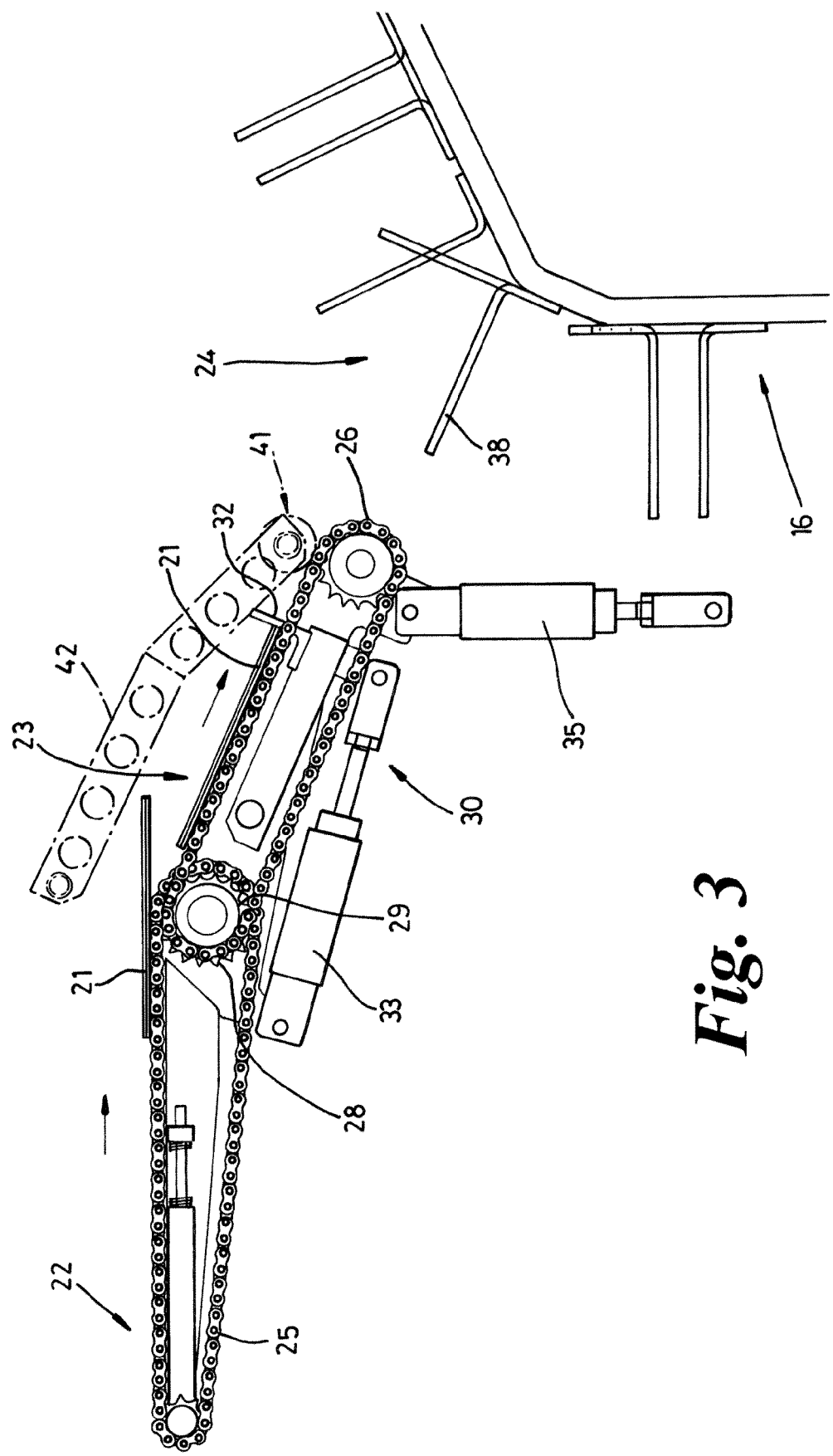
FIG. 3 is an enlarged view showing the interrelationship of 3 conveyors in the apparatus of FIGS. 1 and 2 and FIGS. 4 (1)(2)(16) are sequential views demonstrating the operation of the conveyors of FIG. 3.
Figure 4:
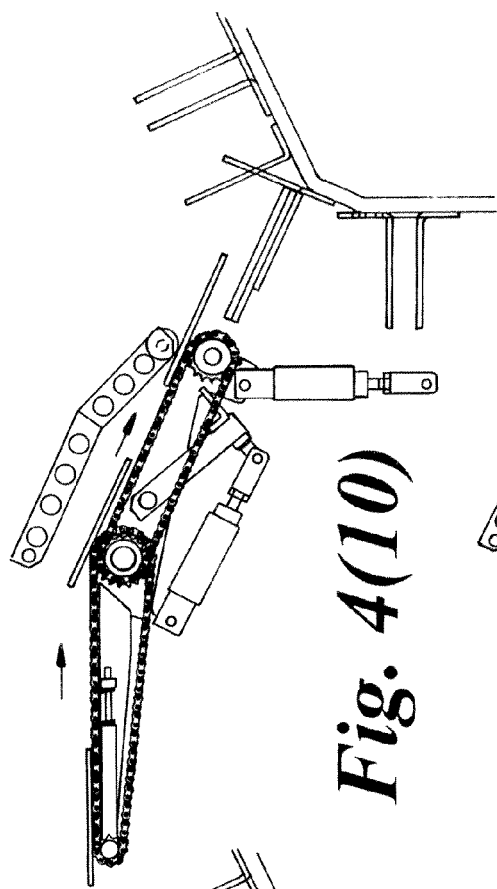
Figure 4:
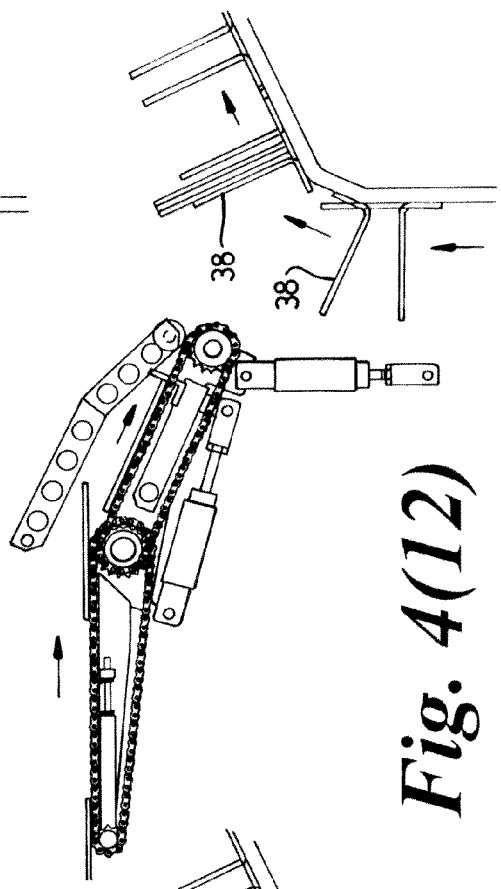
Figure 4:
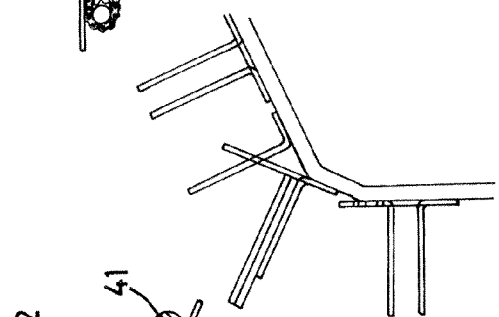
Figure 4:
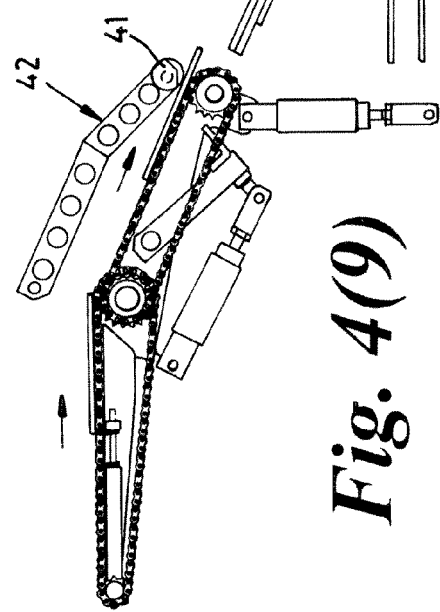

The arrangement of the transfer conveyors 22, 22' and the interrupt conveyors 23, 23' will now be described in more detail with reference solely to the conveyors 22, 23 as shown in FIGS. 3 and 4.

Considering FIG. 3 first, the transfer conveyor 22 and the interrupt conveyor 23 are both chain driven by respective chains 25, 26 from a single shaft 27 via respective sprockets 28, 29. It will be seen that sprocket 28 is of larger diameter than the sprocket 29 so that the transfer conveyor 22 is driven more quickly than the interrupt conveyor 23. An interrupt device, generally indicated at 30, is located beneath the bed of the interrupt conveyor 23 and comprises a pivoted lever 31 on which are mounted upstanding stops 32 and a hydraulic ram 33, which can be used to pivot the lever 31 so that the stops 32 can either be inserted through the bed of conveyor 23 to define an interrupt location 34 or can be withdrawn beneath the bed so as to allow the passage of plates 21 along the conveyor 23.

The interrupt conveyor 23 is pivotally mounted about the axis of shaft 27 and is provided with a further hydraulic ram 35, which can raise and lower its free end 36 so as to adjust the angle of the interrupt conveyor 23 relative to the transfer conveyor 22 and the pocket conveyor 16. It will be noted that the angle of the conveyor 23 is conveniently set at the angle taken up by the rearward pocket plate 37 at the point at which plates are about to be delivered to it, as described in more detail below.

FIGS. 4 (1)(2)(16) illustrate the operation of sequence of the conveyors 22, 23 and 16.

Thus in FIG. 1, a first stack 1 of plates 21 reaches the end of transfer conveyor 22 and are driven to project beyond the downstream or one end 39 of the conveyor 22. When driven further, they begin to over balance (see FIG. 4(2)) and then gently descend onto the conveyor 23 (see FIG. 4(3)) where they have become held at the interrupt location 34 by stops 32 which are in their raised position. (see FIG. 4(4)) At this point a second stack 2 of plates 21 has reached the one end 39 of the transverse conveyor and they too over balance (see FIGS. 4(5) and 4(6)) and are driven onto the top of plates 1 by their residual contact with the conveyor 22. It will be seen that the rear plate 38 of the adjacent pocket 24 on the conveyor 16 is generally aligned with the conveyor 23. Next the interrupt stops 32 are withdrawn by the ram 33 (see FIG. 4(7)) so that the stacked plates 1 and 2 are then driven forward where they over balance into the pocket 24 (see FIG. 4(8)). At that time a third stack 3 is beginning to over balance onto the conveyor 23 and these plates are then fed directly down into the pocket 24 on top of plates 1 and 2 (see FIGS. 4(9) and (10)) at which point they are being followed by a further stack 4. However, the ram 33, at that point raises the stops 32 into their operative position so that they retain plates 4 at the interrupt location. A group 40 has thus been formed from stacks 1, 2 and 3 and passes along the conveyor 16 (see FIG. 4(12)). The process is then repeated for stacks 4, 5 and 6 (see FIGS. 4(13) to 4(16)) and the stops 32 will be pushed into their operative position to catch mini stack 7.

It will be noted that the conveyer 16 is intermittently driven so that each plate 38 waits whilst the group is formed, but in reality this pause is for a very short time indeed.

It will be understood, as mentioned above, that the provision of the third conveyor with an interrupt enables the initial stack of 4 plates to be formed simply by the second mini stack gently over balancing onto the first stack. Further the interrupt conveyor 23 substantially bridges the gap between the transfer conveyor 22 and the pocket conveyor 16 meaning that the plates can be delivered more gently and at lower speed without compromising the production rate of the whole apparatus 10.

The apparatus may be required to handle plates of different heights. To this end the position of the stops can be adjusted longitudinally and the relative positions of the conveyors can also be adjusted.

So far no reference has been made to the hold down roller 41, because this element is essentially optional. The hold down roller 41 is mounted on a pivoted arm 42 and is balanced so that, in the absence of any plates, it will rest on the conveyor 23. As any plate or plates 21 pass along the conveyor 23, the weight of the roller arm combination 41, 42 bears down on the uppermost plate surface pressing the plate or plates against the conveyor 23 so that the plates move at the speed of the conveyor 23. This overcomes any tendency of the plates to skid when released by the stop 32, which can lead to plates, particularly short plates, dropping off the end of the conveyor 23 rather than being pushed by the conveyor into the appropriate pocket 24.

What is claimed is:

1. Apparatus for forming groups of battery plates including:
    (a) a first conveyor having a conveying surface for conveying spaced plates or stack of plates towards one end thereof;
    (b) a second conveyor spaced from the one end and defining pockets for receiving the plates or stacks of plates to define groups of plates wherein the apparatus further includes a third conveyor substantially bridging a gap between the one end of the first conveyor and the second conveyor and an interrupt device for temporarily retaining plates or stack of plates on the third conveyor at an interrupt location so as to await the presentation of an empty pocket adjacent the gap; and
    (c) a control for controlling operation of the interrupt device, the control including a memory for retaining the control settings for any particular plate size to allow automatic resetting of the apparatus when a particular plate size is to be processed.

2. Apparatus as claimed in claim 1 wherein the interrupt location lies beneath the level of the conveying surface of the first conveyor.

3. Apparatus as claimed in claim 1 further including a first motive source for driving the first conveyor at a first speed and a second motive source for driving the second conveyor at a second slower speed.

4. Apparatus as claimed in claim 1 wherein the third conveyor extends at an angle to first conveyor so that the plates or stacks of plates transfer by overbalancing at the one end.

5. Apparatus as claimed in claim 1 wherein the interrupt device includes one or more stops for insertion and withdrawal from a path of travel of the plates or stacks of plates along the third conveyor.

6. Apparatus as claimed in claim 5 wherein the stops are inserted and withdrawn through the third conveyor.

7. Apparatus as claimed in claim 1 further including a hold down device acting on the third conveyor.

8. Apparatus as claimed in claim 2 wherein the third conveyor extends at an angle to the first conveyor so that the plates or stacks of stacks transfer by overbalancing at one end.

9. Apparatus for forming groups of battery plates including:
   (a) a first conveyor having a conveying surface for conveying spaced plates or stack of plates towards one end thereof;
   (b) a second conveyor spaced from the one end and defining pockets for receiving the plates or stacks of plates to define groups of plates wherein the apparatus further includes a third conveyor substantially bridging a gap between the one end of the first conveyor and the second conveyor and an interrupt device for temporarily retaining plates or stack of plates on the third conveyor at an interrupt location so as to await the presentation of an empty pocket adjacent the gap; and
   a control for controlling the speeds of the conveyors, wherein the control includes a memory for returning the control settings for any particular plate size to allow automatic resetting of the apparatus when a particular plate size is to be processed.

10. Apparatus as claimed in claim 9 wherein the control also controls the operation of the interrupt device.

11. Apparatus for forming groups of battery plates including:
   (a) a first conveyor having a conveying surface for conveying spaced plates or stack of plates towards one end thereof;
   (b) a second conveyor spaced from the one end and defining pockets for receiving the plates or stacks of plates to define groups of plates wherein the apparatus further includes a third conveyor substantially bridging a gap between the one end of the first conveyor and the second conveyor and an interrupt device for temporarily retaining plates or stack of plates on the third conveyor at an interrupt location so as to await the presentation of an empty pocket adjacent the gap; and
   (c) a first motive source for driving the first conveyor at a first speed and a second motive source for driving the second conveyor at a second slower speed, wherein each motive source includes a sprocket and the sprockets are mounted on a common shaft, the first motive source sprocket having a larger diameter than the second motive source sprocket to provide the difference in conveyor speeds.

12. Apparatus for forming groups of battery plates including:
   (a) a first conveyor having a conveying surface for conveying spaced plates or stack of plates towards one end thereof; and
   (b) a second conveyor spaced from the one end and defining pockets for receiving the plates or stacks of plates to define groups of plates wherein the apparatus further includes a third conveyor substantially bridging a gap between the one end of the first conveyor and the second conveyor and an interrupt device for temporarily retaining plates or stack of plates on the third conveyor at an interrupt location so as to await the presentation of an empty pocket adjacent the gap, wherein
   the third conveyor extends at an angle to first conveyor so that the plates or stacks of plates transfer by overbalancing at the one end and the angle of the third conveyor is generally equal to the orientation of a pocket when it is adjacent the gap.

* * * * *